March 9, 1965  W. G. STAGER  3,172,223
MUSKRAT CALL AND DECOY
Filed Aug. 23, 1963

INVENTOR.
WESLEY G. STAGER,
BY
McMorrow, Berman + Davidson
ATTORNEYS.

3,172,223
MUSKRAT CALL AND DECOY
Wesley G. Stager, Tetrault Road, R.F.D. 1,
Stafford Springs, Conn.
Filed Aug. 23, 1963, Ser. No. 304,000
2 Claims. (Cl. 43—2)

This invention relates generally to animal calls and decoys, and particularly to a call and decoy, for muskrats, wherein both sound and motion are utilized as muskrat attracting factors.

The primary object of the invention is the provision of a practical, easily used, and highly effective device of the kind indicated, wherein controlled and manually exerted air pressure is employed to produce both the sound and the motion factors.

Another object of the invention is the provision of a device of the character indicated above, which comprises a buoyant hollow muskrat simulating body, having hinged fore-legs capable of being moved to simulate swimming when the device is anchored afloat in water, or to simulate feeding motitons, when the device is used on land, the air pressure for operating a muskrat "call" installed on the body and working the fore-legs being produced by squeezing a bulb on a flexible tube leading to the body.

Other important objects and advantageous features of the invention will be apparent from the following description and the accompanying drawings, wherein, for purposes of illustration only, a specific form of the invention is set forth in detail.

In the drawings.

Referring in detail to the drawings, wherein like numerals designate like parts throughout the several views, the illustrated device comprises a muskrat simulating body B, to which an anchor assembly A is secured, an air pressure assembly P connected to the body, and an audible "call" C.

Figure 1:
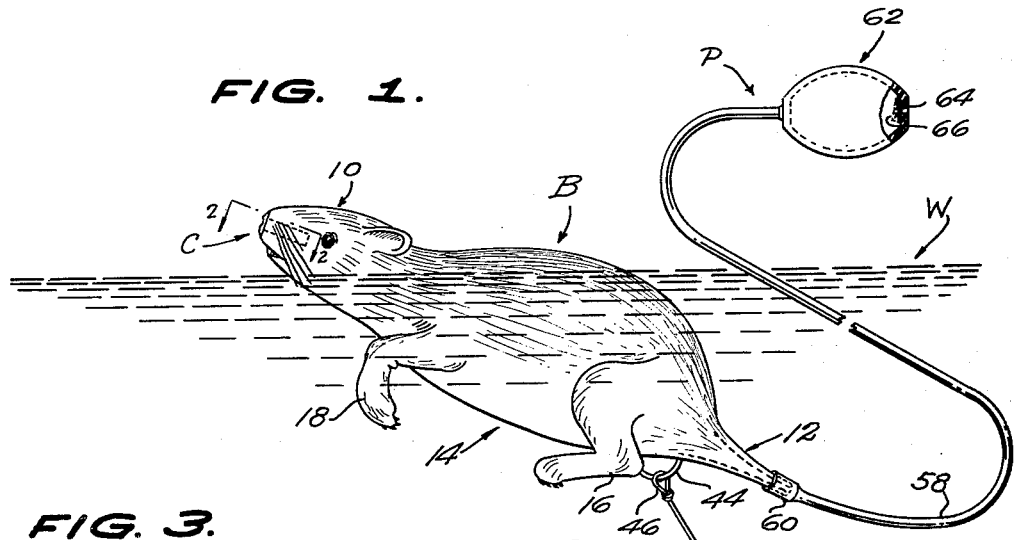
FIGURE 1 is a schematic side elevation, partly broken away and in section, showing a device of the present invention anchored afloat in water.

The body B is hollow and is made of suitable relatively rigid light-weight material, such as plastic, rubber, or rubber-like material, and includes a forwardly extending and forwardly tapered head portion 10, a rearwardly tapered and rearwardly extending tail portion 12, on related ends of and communicating with the main portion 14 of the body. Hollow rear legs 16 extend downwardly and forwardly from the opposite sides of the rear part of the main portion 14, and are arranged in crouching positions.

Hollow fore-legs 18 extend forwardly and downwardly from the opposite sides of the forward part of the main body portion 14, and are in communication with the interior thereof. The fore-legs 18 are arranged in downwardly crooked swimming or food-holding positions.

Figure 5:
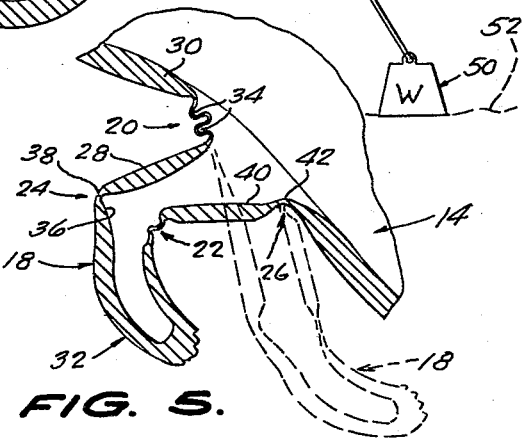
FIGURE 5 is an enlarged fragmentary vertical longitudinal section taken through the body of the device and its fore-legs.

As shown in FIGURE 5, the material of the sidewalls of the fore-legs 18 is substantially reduced in thickness to obtain flexibility and form upper hinges 20, lower hinges 22, and forward and rear intermediate hinges 24 and 26, respectively. The upper hinges 20 connect the tops of the main fore-leg portions 28 with the sidewall 30 of the main body portion 14. The lower hinges 22 connect the upper rear sides of the paw portions 32 with the forward ends of the lower portions of the main fore-leg portions 28. As shown in FIGURE 5, the upper and lower hinges are relatively long or wide and consist of alternate folds 34 which provide bellows effects, affording maximum flexibility of movements of the main fore-leg portions relative to the main body portion 14, and of the paw portions relative to the main fore-leg portions.

The forward intermediate hinges 24 are located in the front knee areas of the fore-legs 18 and comprise single horizontal transverse grooves 36 in the inner surfaces of the fore-leg side-walls, which define relatively single thin and flexible sidewall portions 38.

The rear intermediate hinges 26 connect the rear ends of the under sides of the main fore-leg portions 28 with the sidewall of the main body portion 14 and are spaced rearwardly from the lower hinges 22. The hinges 26 comprise horizontal transverse grooves 40 formed upwardly in the sidewall of the main body portion 14, which define single thin and flexible sidewall portions 42.

It will be understood that any other similarly suitable hinging of the fore-legs 18 to the main body portion 14, and of the paw portions 32 to the main fore-leg portions 28, are within the scope of the present invention.

The underside of the main body portion 14, at the rear end thereof, is provided with a longitudinally disposed rigid loop 44, through which is snap-hooked, as indicated at 46, the upper end of the cord 48 of the anchor assembly A. A weight 50 is attached to the lower end of the cord 48, and is adapted to rest, as shown in FIGURE 1, upon the bottom 52 of a body of water W, so as to anchor the body B afloat in the water, with its head portion 10 above water level. To accommodate for different water depths, the cord 48 is adjustable in length, as by providing a loop 54 therein, which is frictionally engaged through the restricted opening of a ring 56.

The fore-legs 18 are moved, to simulate swimming motions, in the water, or food-holding motions, on land, by manual operation of the air-pressure assembly P. The assembly P comprises a flexible tube 58, of appropriately long enough length to reach from the body B to a place of concealment for the hunter, the forward end of the tube being sleeved, as indicated at 60, over the rear end of the tail portion 12.

A squeeze bulb 62 is connected to and is in communication with the rear end of the tube 58, and has, in its rear end, a conventional outside air intake opening 64 and valve 66, whereby, when the bulb is squeezed the valve 66 closes the opening 64 and air is forced into the body B, and relaxing of the bulb opens the valve and draws air into the bulb through the opening 64.

In operation, squeezing the bulb 62 exerts air pressure against air already present within the body B and fore-legs 18, so that while the body tends to expand but does not because of its relatively rigid character, the fore-legs 18, due to their flexible hinges, are caused to move downwardly and rearwardly, relative to the main body 14, so as to simulate the above-described swimming or food-holding motions, whereby to watching muskrats the device appears as a live normally active muskrat.

Figure 3:
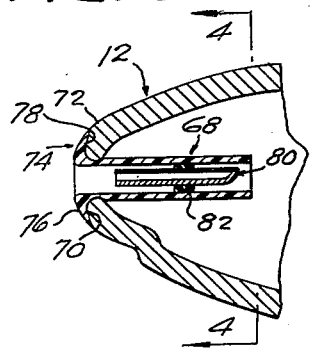
FIGURE 3 is a similar section taken on the line 3—3 of FIGURE 2.
Figure 4:
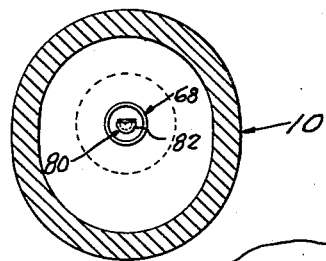
FIGURE 4 is a transverse section taken on the line 4—4 of FIGURE 3.
Figure 2:
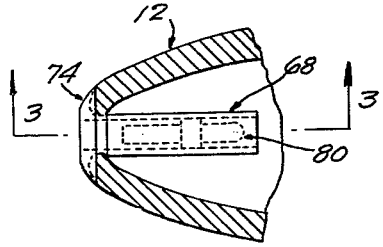
FIGURE 2 is an enlarged fragmentary longitudinal section taken on the line 2—2 of FIGURE 1.

For further simulation of a live muskrat, the device is provided with a "call" C. The "call" C comprises a horizontal longitudinal, open-ended tubular housing 68, which is preferably of rigid plastic material and which is positioned axially in the head portion 10 of the body B and is secured, at its forward end, through an opening 70 formed in the nose 72 thereof. On the forward end of the housing 68 is an annular, enlarged diameter flange 74, which, as shown in FIGURE 3, has a convex forward side 76 and a concave rearward side 78, the concave side being conformably secured to the rounded exterior of the nose 72, around and extending into the opening 70.

An axially disposed reed 80 is supported in concentrically spaced relation, within the housing 68, by means of a compressible ring 82, which serves also as an air seal. As shown in FIGURE 3, the forward end of the reed 80 is spaced rearwardly from the forward end of the housing 68, so that the space, within the housing, forward of the reed, acts as a trumpet or sound amplifier, which amplifies sound produced by the passage of air forwardly through the housing 68, and the reed 80, whenever the squeeze bulb 62 is squeezed.

The reed 80 is tuned to produce a muskrat "call" or other noises normal to live and active muskrats, and the characteristics and volume of sound produced can be controllably varied, as well as the actions of the fore-legs 18, by controlled squeezing of the bulb 62.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A device of the character described, comprising a buoyant hollow substantially rigid animal body having forward and rear ends, hollow fore-legs flexibly connected to opposite sides of the body at the forward end thereof, the interior of said fore-legs being in communication with the interior of the body, and an air pressure assembly connected in communication with the interior of the body and adapted to alternately produce increase of and relaxation of air pressure within the body and the fore-legs for moving the fore-legs relative to the body, said fore-legs comprising upper main portions and lower paw portions, first hinge means connecting the upper ends of the main portions with the sidewall of the body, and second hinge means connecting the lower ends of the main portions with the upper ends of the paw portions, said first hinge means comprising upper hinges and rear intermediate hinges, said second hinge means comprising lower hinges and forward intermediate hinges, said upper and lower hinges comprising flexible thin portions of the sidewalls of the fore-legs, formed with alternate folds.

2. A device of the character described, comprising a buoyant hollow substantially rigid animal body having forward and rear ends, hollow fore-legs flexibly connected to opposite sides of the body at the forward end thereof, the interior of said fore-legs being in communication with the interior of the body, and an air pressure assembly connected in communication with the interior of the body and adapted to alternately produce increase of and relaxation of air pressure within the body and the fore-legs for moving the fore-legs relative to the body, said fore-legs comprising upper main portions and lower paw portions, first hinge means connecting the upper ends of the main portions with the sidewall of the body, and second hinge means connecting the lower ends of the main portions with the upper ends of the paw portions, said first hinge means comprising upper hinges and rear intermediate hinges, said second hinge means comprising lower hinges and forward intermediate hinges, said upper and lower hinges comprising flexible thin portions of the sidewalls of the fore-legs formed with alternate folds, said forward and rear intermediate hinges comprising single grooves in the sidewalls of the fore-legs defining relatively thin flexible portions.

References Cited by the Examiner

UNITED STATES PATENTS

| | | | |
|---|---|---|---|
| 1,649,722 | 11/27 | Munro | 46—180 |
| 1,989,460 | 1/35 | Porter | 43—42.3 X |
| 2,227,242 | 12/40 | Boutin | 43—3 |
| 2,796,605 | 6/57 | Ashley | 43—26.2 |
| 2,909,859 | 10/59 | Christmas | 43—3 |
| 3,034,245 | 5/62 | Lynch | 43—3 |

ABRAHAM G. STONE, *Primary Examiner.*